United States Patent
Kim et al.

(10) Patent No.: US 9,523,313 B2
(45) Date of Patent: Dec. 20, 2016

(54) SYSTEM AND METHOD FOR LOADING A COMBINED CYCLE POWER PLANT

(71) Applicant: General Electric Company, Schenectady, NY (US)

(72) Inventors: Kihyung Kim, Atlanta, GA (US); Seyfettin Can Gulen, Schenectady, NY (US); Brett Matthew Thompson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 768 days.

(21) Appl. No.: 13/798,044

(22) Filed: Mar. 12, 2013

(65) Prior Publication Data

US 2014/0260284 A1    Sep. 18, 2014

(51) Int. Cl.
| | |
|---|---|
| *F02C 1/00* | (2006.01) |
| *F02C 7/057* | (2006.01) |
| *F02C 6/18* | (2006.01) |
| *F02C 9/20* | (2006.01) |

(52) U.S. Cl.
CPC ............... *F02C 7/057* (2013.01); *F02C 6/18* (2013.01); *F02C 9/20* (2013.01); *Y02E 20/16* (2013.01)

(58) Field of Classification Search
CPC ............... F23R 3/26; F02C 9/42; F02C 7/042; F02C 7/26; F02C 7/057; F01D 17/00
USPC ......... 60/39.23, 794, 39.182, 773, 793, 786, 60/778, 39.13
See application file for complete search history.

(56) References Cited

U.S. PATENT DOCUMENTS

| | | | | | |
|---|---|---|---|---|---|
| 4,010,605 | A | * | 3/1977 | Uram | F02C 7/26 60/39.182 |
| 4,184,324 | A | * | 1/1980 | Kiscaden | F01D 21/12 122/7 B |
| 4,333,310 | A | * | 6/1982 | Uram | F01K 23/105 60/39.182 |
| 5,044,152 | A | * | 9/1991 | Hoizumi | F01K 23/101 60/39.182 |
| 5,412,936 | A | * | 5/1995 | Lee | F01K 23/101 60/39.182 |
| 5,857,321 | A | * | 1/1999 | Rajamani | F02C 9/28 60/39.24 |
| 6,364,602 | B1 | * | 4/2002 | Andrew | F01D 21/10 415/1 |
| 6,912,856 | B2 | * | 7/2005 | Morgan | F02C 9/28 60/39.281 |
| 7,621,133 | B2 | * | 11/2009 | Tomlinson | F01K 13/02 60/39.182 |

(Continued)

*Primary Examiner* — Audrey K Bradley
*Assistant Examiner* — Jason T Newton
(74) *Attorney, Agent, or Firm* — Fletcher Yoder, P.C.

(57) ABSTRACT

A system including a gas turbine system configured to transition between a first load state and a second load state, wherein the gas turbine system comprises an airflow control module configured to adjust an airflow through the gas turbine system between a minimum airflow condition and a maximum airflow condition, and a controller configured to control the gas turbine system to operate with a load path between a first load path corresponding to the minimum airflow condition and a second load path corresponding to the maximum airflow condition, wherein the controller is configured to control the gas turbine system to transition between the first load state and the second load state using the load path between the first and second load paths.

21 Claims, 4 Drawing Sheets

(56) References Cited

U.S. PATENT DOCUMENTS

| | | | | |
|---|---|---|---|---|
| 8,099,941 B2* | 1/2012 | Myers | ............ | F23N 5/00 |
| | | | | 60/39.23 |
| 8,406,978 B2* | 3/2013 | Nomura | ............ | F02C 9/28 |
| | | | | 701/100 |
| 2009/0145104 A1* | 6/2009 | Alexander | ............ | F01K 23/101 |
| | | | | 60/39.182 |
| 2009/0158738 A1* | 6/2009 | Hu | ............ | F01K 23/108 |
| | | | | 60/646 |
| 2013/0125557 A1* | 5/2013 | Scipio | ............ | F02C 9/22 |
| | | | | 60/773 |
| 2014/0208765 A1* | 7/2014 | Ekanayake | ............ | F02C 9/16 |
| | | | | 60/774 |
| 2014/0331686 A1* | 11/2014 | Gulen | ............ | F01K 23/10 |
| | | | | 60/783 |

* cited by examiner

SYSTEM AND METHOD FOR LOADING A COMBINED CYCLE POWER PLANT

BACKGROUND OF THE INVENTION

The subject matter disclosed herein relates to combined cycle power plants, and more specifically, a system and method for loading a combined cycle power plant.

Combined cycle power plants combine gas turbine systems with steam turbine systems to produce electricity while reducing energy waste. In operation, the gas turbine systems combust a fuel-air mixture to create torque that drives a load, such as an electrical generator. In order to reduce energy waste, the combined cycle power plants use the thermal energy in the gas turbine system exhaust gases to create steam. The steam travels through a steam turbine system creating torque that drives a load such as an electrical generator. Unfortunately, electrical grids may receive power from a variety of sources, increasing the number of times a combined cycle power plant turns on and off (i.e., supplies power to the electrical grid) depending upon demand.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system including a gas turbine system configured to transition between a first load state and a second load state, wherein the gas turbine system comprises an airflow control module configured to adjust an airflow through the gas turbine system between a minimum airflow condition and a maximum airflow condition, and a controller configured to control the gas turbine system to operate with a load path between a first load path corresponding to the minimum airflow condition and a second load path corresponding to the maximum airflow condition, wherein the controller is configured to control the gas turbine system to transition between the first load state and the second load state using the load path between the first and second load paths.

In a second embodiment, a non-transitory machine readable medium including instructions for controlling a gas turbine system to transition from a first load state to a second load state along a load path between a first load path corresponding to a minimum airflow condition and a second load path corresponding to a maximum airflow condition, wherein the instructions for controlling the gas turbine system comprise instructions for controlling an airflow control module to adjust an airflow through the gas turbine system between the minimum airflow condition and the maximum airflow condition.

In a third embodiment, a method including controlling a gas turbine system to transition from a first load state to a second load state along a load path between a first load path corresponding to a minimum airflow condition and a second load path corresponding to a maximum airflow condition, wherein controlling the gas turbine system comprises controlling an airflow control module to adjust an airflow through the gas turbine system between the minimum airflow condition and the maximum airflow condition.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed to a system and method for loading a combined cycle power plant with operating constraints along different load paths. The operating constraints may include minimum emission compliance loads (MECL); heat recovery steam generator (HRSG) limitations; balance of plant (BOP) system limitation (i.e., steam pipes, water treatment plant, condenser 49, feed water system, etc.); among others. For example, the combined cycle power plant may operate under MECL restrictions, which require that the gas turbine system comply with emissions requirements when the load is above a threshold level. The system and methods described below enable shorter startup times for the combined cycle power plant (i.e., increasing a gas turbine system load and a steam turbine system load from a no-load or first load state to a base load/dispatch power load or a second load state). Specifically, the system enables shorter startup times through increased steam production by loading of the gas turbine system along different load paths. In particular, the system controls the gas turbine exhaust gas temperature and loading to optimize steam production in the HRSG. Thus, the HRSG more rapidly produces steam of a sufficient temperature and pressure for the steam turbine system, thereby accelerating startup of the steam turbine system.

Figure 1:
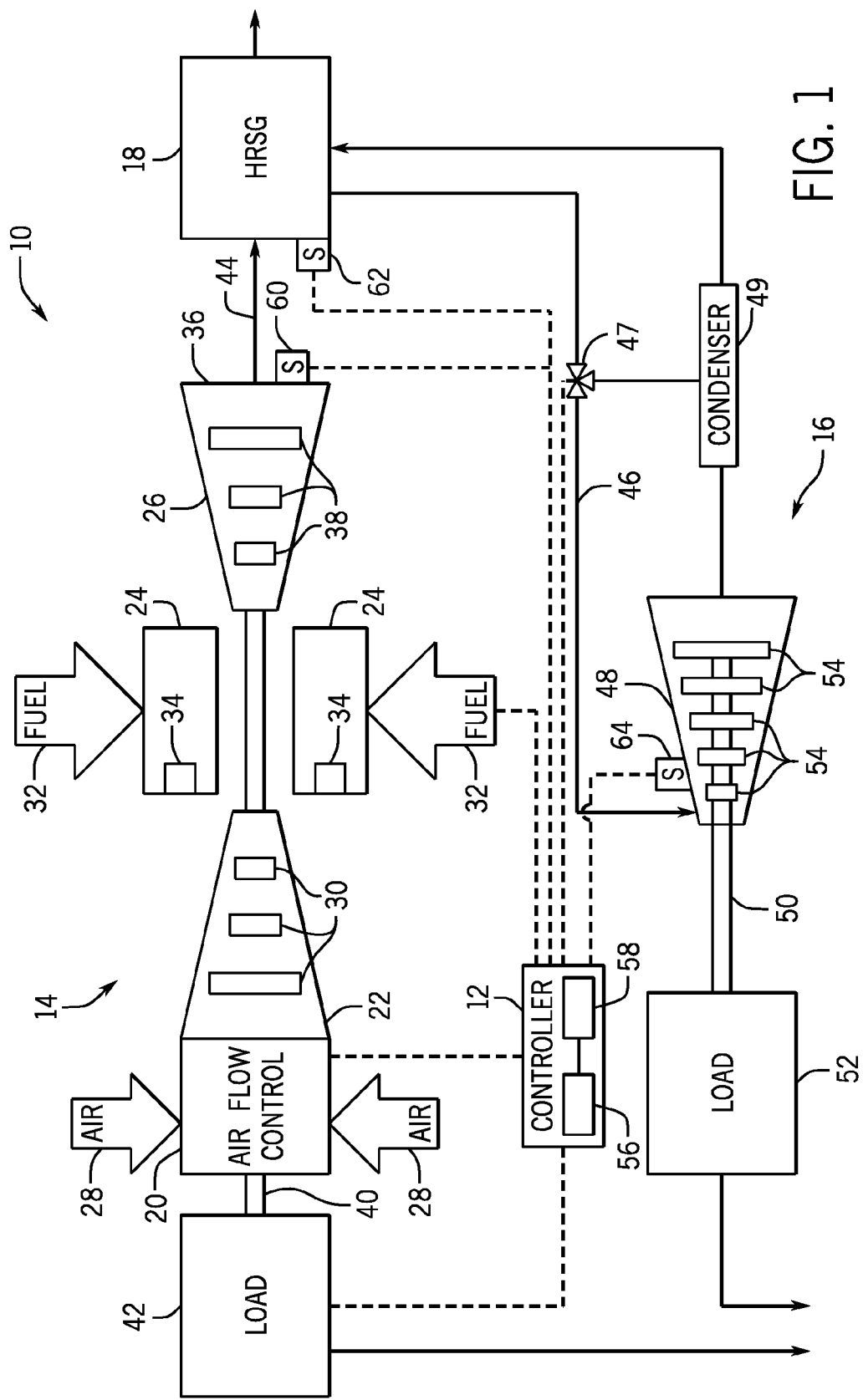
FIG. 1 is a block diagram of an embodiment of a combined cycle power plant.

FIG. 1 is a block diagram of an embodiment of a combine cycle power plant 10 with a controller 12 that enables loading along different load paths. More specifically, the controller 12 enables the combined cycle power plant 10 to rapidly increase electrical output (i.e., loading) from an inactive state (i.e., no electrical output) to an active state (i.e., electrical output requested for grid), or in other words a starting load to a base load/dispatch power load. More specifically, the controller 12 enables the combined cycle power plant 10 to increase power output from a gas turbine system 14 and a steam turbine system 16 through increased/accelerated steam production. In some embodiments, the increased/accelerated steam production may be used for a boiler, enabling a boiler to rapidly start. The combined cycle power plant (CCPP) 10 includes the controller 12, gas turbine system 14, the steam turbine system 16, and a heat recovery steam generator (HRSG) 18. In operation, the gas turbine system 14 combust a fuel-air mixture to create torque that drives a load, e.g., an electrical generator. In order to reduce energy waste, the combined cycle power plant 10 uses the thermal energy in the exhaust gases to heat a fluid and create steam in the HRSG 18. The steam travels from the HRSG 18 through a steam turbine system 16 creating torque that drives a load, e.g., an electrical generator. Accordingly, the CCPP 10 combines the gas turbine system 14 with steam turbine system 16 to increase power production while reducing energy waste (e.g., thermal energy in the exhaust gas).

The gas turbine system 14 includes an airflow control module 20, compressor 22, combustor 24, and turbine 26. In operation, an oxidant 28 (e.g., air, oxygen, oxygen enriched air, or oxygen reduced air) enters the turbine system 14 through the airflow control module 20, which controls the amount of oxidant flow (e.g., airflow). The airflow control module 20 may control airflow by heating the oxidant flow, cooling the oxidant flow, extracting airflow from the compressor 22, using an inlet restriction, using an inlet guide vane, or a combination thereof. As the air passes through the airflow control module 20, the air enters the compressor 22. The compressor 22 pressurizes the air 28 in a series of compressor stages (e.g., rotor disks 30) with compressor blades. As the compressed air exits the compressor 22, the air enters the combustor 24 and mixes with fuel 32. The turbine system 14 may use liquid or gas fuel, such as natural gas and/or a hydrogen rich synthetic gas, to run the turbine system 14. For example, the fuel nozzles 34 may inject a fuel-air mixture into the combustor 24 in a suitable ratio for optimal combustion, emissions, fuel consumption, and power output. As depicted, a plurality of fuel nozzles 34 intakes the fuel 32, mixes the fuel 32 with air, and distributes the air-fuel mixture into the combustor 24. The air-fuel mixture combusts in a combustion chamber within combustor 24, thereby creating hot pressurized exhaust gases. The combustor 24 directs the exhaust gases through a turbine 26 toward an exhaust outlet 36. As the exhaust gases pass through the turbine 26, the gases contact turbine blades attached to turbine rotor disks 38 (e.g., turbine stages). As the exhaust gases travel through the turbine 26, the exhaust gases may force turbine blades to rotate the rotor disks 38. The rotation of the rotor disks 38 induces rotation of shaft 40 and the rotor disks 32 in the compressor 26. A load 42 (e.g., electrical generator) connects to the shaft 40 and uses the rotation energy of the shaft 40 to generate electricity for use by the power grid 44.

As explained above, the combined cycle power plant 10 harvests energy from the hot exhaust gases exiting the gas turbine system 14 for use by the steam turbine system 16 or a boiler. Specifically, the CCPP 10 channels hot exhaust gases 44 from the turbine system 14 into the heat recovery steam generator (HRSG) 18. In the HRSG 18, the thermal energy in the combustion exhaust gases converts water into hot pressurized steam 46. The HRSG 18 releases the steam in line 46 for use in the steam turbine system 16.

The steam turbine system 16 includes a turbine 48, shaft 50, and load 52 (e.g., electrical generator). As the hot pressurized steam in line 46 enters the steam turbine 48, the steam contacts turbine blades attached to turbine rotor disks 54 (e.g., turbine stages). As the steam passes through the turbine stages in the turbine 48, the steam induces the turbine blades to rotate the rotor disks 54. The rotation of the rotor disks 54 induces rotation of the shaft 50. As illustrated, the load 52 (e.g., electrical generator) connects to the shaft 50. Accordingly, as the shaft 50 rotates, the load 52 (e.g., electrical generator) uses the rotation energy to generate electricity for the power grid 44. As the pressurized steam in line 46 passes through the turbine 48, the steam loses energy (i.e., expands and cools). After exiting the steam turbine 48, the steam enters a condenser 49 before being routed back to the HRSG 18, where the steam is reheated for reuse in the steam turbine system 16.

As explained above, the controller 12 enables the combined cycle power plant 10 to rapidly increase electrical output (i.e., loading) from an inactive state (i.e., no load) to an active state (i.e., base load or dispatch power load). In other words, the controller 12 enables the combined cycle power plant to flexibly load the gas turbine system 14, which may enable increased steam production in the HRSG 18, and thus a rapid start of the steam turbine system 16. The ability to rapidly start the CCPP 10 and increase the combined loading (i.e., electrical output) of the gas turbine system 14 and the steam turbine system 16 increases the efficiency of the plant, saving time and money. The controller 12 includes a memory 56 and a processor 58. The memory 56 stores instructions and steps written in software code. The processor 58 executes the stored instructions in response to feedback from the CCPP 10. More specifically, the controller 12 controls and communicates with various components in the CCPP 10 in order to flexibly control the loading of the gas turbine system 14, and thus the loading of the steam turbine system 16. As illustrated, the controller 12 controls the airflow control module 20, the intake of fuel 32, and valve(s) 47; and communicates with load 42, exhaust gas temperature sensor 60, HRSG steam temperature sensor 62, and steam turbine metal temperature sensor 64, in order to load the CCPP 10 along different load paths.

In operation, the controller 12 controls the airflow control module 20 and the consumption of fuel 32 to change the loading of the gas turbine system 14 and thereby the loading of CCPP 10 (i.e., how the CCPP 10 increases electrical power output to the grid 44). Specifically, the controller 12 adjusts the mass flow rate and temperature of the exhaust gas 44, which controls how rapidly the HRSG 18 produces steam for the steam turbine system 16, and therefore, how quickly the CCPP 10 produces electrical power using loads 42 and 52. For example, when the controller 12 increases the airflow with the airflow control module 20, it increases the amount of airflow flowing through the compressor 22, flow through the combustor 24, and flow through the turbine 26. The increase in airflow increases the mass flow rate of the exhaust gas, and thus the torque of the shaft 40. Moreover, the increase in the mass flow rate of the exhaust gas 44 increases the amount of thermal energy available for the HRSG 18 to produce steam (i.e., more exhaust gas is flowing through the HRSG 18). An increase in steam production by the HRSG 18 reduces startup time for the steam turbine system 16 and thus electrical output from the load 52.

As explained above, the controller 12 controls fuel consumption by the gas turbine system 14. Control of the fuel 32 affects the mass flow rate through the gas turbine system 14 and the thermal energy available for the HRSG 18. For example, when the controller 12 increases fuel consumption the temperature of the exhaust gas 44 increases. The increase in the exhaust gas temperature 44 enables the HRSG 18 to produce steam at higher temperatures and pressures, which translates into more power production by the steam turbine system 16. However, when the controller 12 decreases fuel consumption there is a reduction in the temperature of the exhaust gas. Accordingly, there is less mechanical energy available to drive load 42 and less thermal energy available to produce steam for the steam turbine system 16 to drive load 52.

Figure 2:
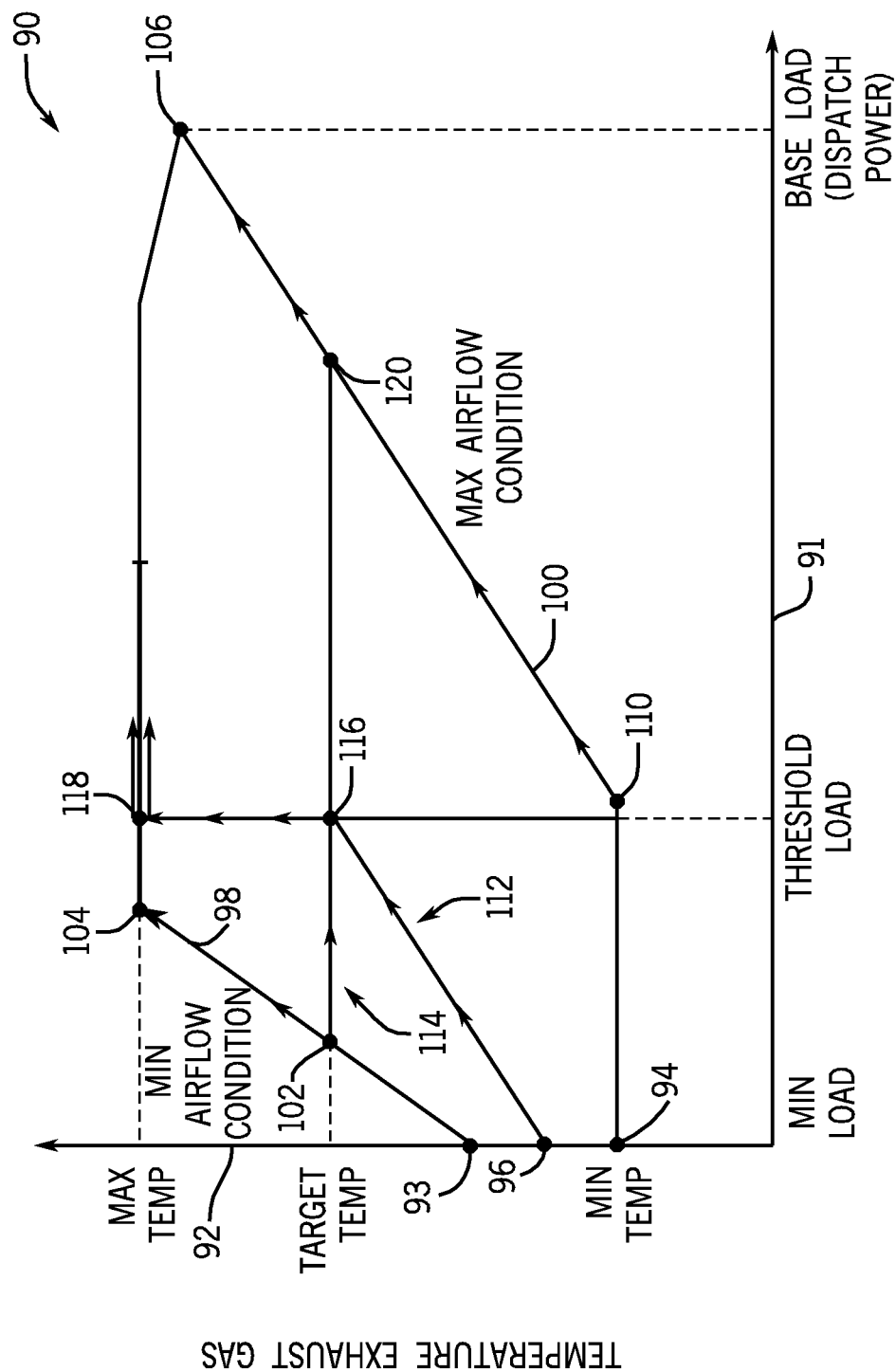
FIG. 2 is a graph illustrating different loading paths for a combined cycle power plant.

FIG. 2 is a graph illustrating loading of the combined cycle power plant 10 with the controller 12 along different load paths. Specifically, the graph 90 illustrates different load paths for loading the gas turbine system 14 to a base load or dispatch power load (i.e., power requested for grid 44). As illustrated, the graph includes an x-axis 91 representing loading of the gas turbine system 14, and a y-axis 92 that represents the temperature of gas turbine exhaust gases. As discussed above, the controller 12 reduces startup time for the combined cycle power plant 10 (i.e., the controller 12 enables the combine cycle power plant 10 to increase power production in a reduced amount of time).

As the graph 90 illustrates, there are different load paths for loading the gas turbine system 14. The load paths may start at the minimum load (e.g., spinning reserve point or minimum required load for startup by plant operator) and at different temperatures between the min and max temperature along y-axis 92. In order to follow a load path, the controller 12 executes code that manipulates airflow through the airflow control module 20 and fuel intake to increase the load. As the controller 12 directs the air and fuel intake into the system 14, the controller 12 influences how quickly the gas turbine system 14 and the steam turbine system 16 load (i.e., increase power output).

As illustrated, the graph illustrates a load path 98 with the airflow control module 20 operating at a minimum airflow condition (i.e., the airflow control module 20 minimizes airflow), and a load path 100 with the airflow control module 20 operating at a maximum airflow condition (i.e., the airflow control module 20 maximizes airflow). These load paths 98 and 100 define the operational boundaries of the gas turbine system 14 when operating within the combined cycle power plant 10. As explained above, the controller 12 enables the combined cycle power plant 10 to load the gas turbine system 14 along different load paths, or in other words the controller 12 enables the gas turbine system 14 to operate between the flow path 98 (e.g., minimum airflow condition) and the flow path 100 (e.g., maximum airflow condition). More specifically, the controller 12 may increase the exhaust gas temperature, decrease the exhaust gas temperature, increase the load, or decrease the load in any way between the load path 98 and the load path 100 in order to minimize CCPP 10 startup time. However, the CCPP 10 may operate under operational constraints (i.e., HRSG limitations, minimum emissions compliance load, balance of plant system limitations, etc.) that block some loading paths between the flow paths 98 and 100.

As illustrated, load path 98 starts at point 93. At point 93, the gas turbine system 14 is operating and producing exhaust gas at a starting temperature, and producing power at a minimum load with the load 42. The controller 12 executes instructions that increase the load by increasing fuel consumption while substantially maintaining the airflow control module 20 at a minimum airflow condition. The increased fuel consumption increases the temperature of the exhaust gases flowing through the turbine 26, which increases the mechanical energy available for load 42 (e.g., electrical generator) to generate electricity. The controller 12 continues increasing fuel consumption while minimizing airflow through the airflow control module 20, until the temperature of the exhaust gases substantially reaches a target temperature (e.g., within a range 0-200, 0-150, 0-100, 0-50 degrees of temperature at point 102). In other words, the controller 12 increases the gas turbine system 14 exhaust gas temperature and load along path 98 from point 93 to point 102.

The target temperature (i.e., temperature at point 102) is the point at which the gas turbine exhaust gas temperature (measured by sensor 60) equals the steam turbine metal temperature (measured by sensor 64) or is within a range of the steam turbine metal temperature. For example, the gas turbine exhaust gas temperature may be within approximately 0-200, 0-150, 0-100, 0-50, etc. degrees of the steam turbine metal temperature at point 102 (i.e., the target temperature). The controller 12 temporarily limits higher exhaust gas temperatures at point 102, in order to avoid increased steam temperatures in the HRSG 18. More specifically, the controller 12 executes control actions to reduce or minimize temperature differences between the steam entering the steam turbine 48 from the HRSG 18 and the temperature of the metal in the steam turbine 48. Large temperatures differences may cause excess thermal stress and wear on components in the steam turbine 48. Thus, the controller 12 executes the control actions that may avoid such large temperature differences. In particular, the controller 12 monitors an exhaust gas temperature sensor 60, HRSG steam temperature 62, and steam turbine metal temperature 64 to reduce temperature differences in the CCPP 10 (i.e., reducing thermal stress of components in the HRSG 18 and/or steam turbine system 16). Accordingly, the controller 12 executes instructions that temporarily maintain exhaust gas temperatures and loading of the gas turbine system 14 at point 102. The controller 12 substantially maintains the exhaust gas temperature at the target temperature until the controller 12 senses with sensor 62 that the HRSG 18 is producing enough steam at substantially the target conditions (i.e., steam pressure, flow rate, and temperature) to operate the steam turbine system 16. Once the target conditions are met, the controller 12 executes instructions enabling the valve 47 to redirect steam into the steam turbine 48 (i.e., stop delivering steam to the condenser 49). Once the steam turbine system 16 begins operating, the controller 12 executes instructions to increase the temperature of exhaust gas 44 in the gas turbine system 14 to the maximum temperature at point 104. In other words, the controller 12 increases the gas turbine system 14 exhaust gas temperature and load, along path 98 from point 102 to point 104. As the gas turbine system 14 increases the temperature of the exhaust gas, the HRSG 18 correspondingly increases steam temperatures to the maximum temperature at point 104.

At point 104, the controller 12 controls the airflow control module 20 to increase airflow through the gas turbine system 14. The additional airflow rapidly increases torque which increases the electrical output (i.e., loading) of load 42.

Likewise, the increased airflow increases the mass flow rate of exhaust gas 44, and thus the thermal energy available for steam production in the HRSG 18. The increase in steam passing through the steam turbine system 16 increases the load 52 (e.g., electrical generator), thereby increasing generation of electricity. As illustrated, the controller 12 continues to increase the loading of the gas turbine system 14 until reaching the base load or dispatch power load at point 106. In other words, the controller 12 increases the gas turbine system 14 exhaust gas temperature and load along path 98 from point 104 to point 106 (i.e., base load or dispatch power load). The CCPP 10 may then stay at point 106 until grid requirements decrease.

As explained above, the CCPP 10 may use the controller 12 to load the gas turbine system 14 on loading path 100 to a base load or dispatch power load (i.e., along flow path 100 from point 94 to point 106). In contrast to loading path 98, the loading path 100 maximizes airflow through the airflow control module 20 into the gas turbine system 14. More specifically, when following load path 100, the controller 12 executes instructions to maximize airflow through the airflow control module 20. As illustrated, load path 100 begins at point 94. At point 94, the gas turbine system 14 is operating and producing exhaust gas at a starting temperature, and power at a minimum load with the load 42. In order to follow load path 100, the controller 12 executes instructions that increase airflow with the airflow control module 20 while maintaining constant gas turbine exhaust gas temperature. As the controller 12 continues to increase airflow with the airflow control module 20, the gas turbine system 14 rapidly increases the mass flow rate of the exhaust gas, which increases the mechanical energy available for power production by load 42. Moreover, as the mass flow rate of the exhaust gas increases, more thermal energy is available for the HRSG 18. Thus, the HRSG 18 is able to rapidly produce steam at the temperature of 94. As illustrated, the controller 12 continues to increase airflow with the airflow control module 20 and increase the load on the gas turbine system 14 until reaching the load at point 110. In other words, the controller 12 increases the load on gas turbine system 14 along path 100 from point 94 to point 110. Once a sufficient amount of steam is produced substantially at the temperature of point 94 (e.g., within 0-200, 0-150, 0-100, 0-50 degrees of the temperature at point 94), the controller 12 executes instructions enabling the valve 47 to redirect steam into the steam turbine 48 instead of directly into the condenser 49. After admitting steam into the steam turbine system 16, the controller 12 executes instructions increasing the fuel intake into the gas turbine system 14. The increased fuel consumption raises the exhaust gas temperature, which in turn increases the steam temperature within the HRSG 18 for use by the steam turbine system 16. Accordingly, the loading (i.e., electrical power production) increases simultaneously in the gas turbine system 14 and in the steam turbine system 16 as the exhaust gas temperature increase. The controller 12 continues increasing fuel consumption until the gas turbine system 14 reaches the base load or dispatch power load at point 106. In other words, the controller 12 increases the gas turbine system 14 exhaust gas temperature and load along path 100 from point 110 to point 106.

The load paths 98 and 100 define the operational boundaries of the gas turbine system 14 when operating within the combined cycle power plant 10. The load path 98 illustrates the operational boundary condition for minimum airflow through airflow control module 20, while load path 100 illustrates the operational boundary condition for maximum airflow through the airflow control module 20. The load path 100 maximizes airflow through the airflow control module 20, which rapidly increases the loading on the gas turbine system 14 and the thermal energy available for the HRSG 18.

As explained above, the controller 12 enables the combined cycle power plant 10 to load the gas turbine system 14 along different load paths, or in other words the controller 12 enables the gas turbine system 14 to operate between the flow path 98 (e.g., minimum airflow condition) and the flow path 100 (e.g., maximum airflow condition). Specifically, the controller 12 may control the airflow control module 20 and the consumption of fuel 32 in order to bring the gas turbine system 14, and the steam turbine system 16 to a dispatch power load or base load in a reduced amount of time within operational constraints (i.e., HRSG limitations, minimum emissions compliance load, balance of plant system limitations, etc.). For example, some HRSGs may be unable to take advantage of the thermal energy in the exhaust gas when the airflow control module 20 maximizes airflow in the gas turbine system 14 during plant startup. Accordingly, the efficiency of the CCPP 10 is reduced as energy is wasted. In another situation, the CCPP 10 may operate under minimum emissions compliance load restrictions, which require that the gas turbine system 14 comply with emissions requirements when the load is above a threshold level. In still other embodiments, there may be balance of plant system limitations (i.e., steam pipes, water treatment plant, water storage tanks, main steam lines, cooling water system, condenser 49, etc.) that constrain loading of the CCPP 10. Accordingly, the gas turbine system 14 may not be able to operate at a maximum airflow condition with airflow control module 20, as it may increase the load past the threshold load level (e.g., MECL) before CCPP 10 is able to comply with emissions standards.

As further illustrated in FIG. 2, the controller 12 may execute instructions to control the CCPP 10 to follow exemplary load paths 112 and 114, which enable the CCPP 10 to accelerate power production (i.e., rapidly increase steam production for the steam turbine system 16) to the base load or dispatch power load while complying with operational constraints (i.e., HRSG limitations, minimum emissions compliance loads, balance of plant system limitations, etc.). The load path 112 starts at point 96. At point 96, the gas turbine system 14 is operating and producing exhaust gas at a starting temperature, and driving the load 42 at the minimum load. In order to follow load path 112, the controller 12 executes instructions that simultaneously increase airflow with the airflow control module 20 and increase fuel consumption. The controller 12 continues to increase airflow through the airflow control module 20 and fuel consumption to the gas turbine system 14, increasing exhaust gas temperatures and gas turbine system 14 loading until reaching point 116. In other words, the controller 12 increases the gas turbine system 14 exhaust gas temperature and load along path 112 from point 96 to point 116. The increase in loading and temperature raises power output from the gas turbine system 14 and steam production by the HRSG 18 (i.e., decreases the time for the steam turbine system 16 to produce steam). At point 116, the exhaust gas temperature is substantially at the target temperature (e.g., within 0-200, 0-150, 0-100, 0-50 degrees of the temperature at point 116) and the gas turbine load is substantially at a threshold load (e.g., within 1, 2, 3, 4, 5, 6, 7, 8, 9, 10 percent of the load at point 116). The threshold load (i.e., load at point 116) may be an HRSG, minimum emissions compliance load constraint, balance of plant system limitations, etc.

After reaching point 116 the controller 12 executes instructions that enable the gas turbine system 14 to maintain the airflow and fuel consumption (e.g., substantially maintain the exhaust gas temperature and loading at point 116 within 0-200, 0-150, 0-100, 0-50 degrees and 1, 2, 3, 4, 5, 6, 7, 8, 9, 10 percent of the threshold load). The controller 12 substantially maintains the gas turbine system 14 loading and exhaust gas temperature at point 116, while the HRSG 18 produces an amount of steam substantially at the target temperature (e.g., within 0-200, 0-150, 0-100, 0-50 degrees of the temperature at point 116). As explained above, the target temperature (i.e., temperature at point 116) is the point where the temperature of the exhaust gas equals or is within a specific range (e.g., within 0-200, 0-150, 0-100, 0-50 degrees) of the metal temperature in the steam turbine system 14, in order to reduce thermal differences that induce excess thermal stress or wear on steam turbine components. Once the HRSG 18 produces a sufficient amount of steam and at the appropriate temperature (e.g., temperature within a range 0-200, 0-150, 0-100, 0-50 degrees of the temperature at point 116), then the controller 12 executes instructions that open valve 47 admitting steam into the steam turbine 48. After admitting steam into the steam turbine system 16, the controller 12 executes instructions increasing fuel consumption, enabling the gas turbine system 14 to increase the exhaust gas temperature along path 112 from point 116 to 118, while substantially holding the load constant at the threshold load (e.g., within 1, 2, 3, 4, 5, 6, 7, 8, 9, 10 percent of the load at point 116). At point 118, the gas turbine system 14 is operating within the minimum emissions compliance load (i.e., the gas turbine system 14 is within emissions requirements). After reaching point 118, the controller 12 executes instructions to increase fuel consumption and to increase airflow with the airflow control module 20, thus increasing the load along path 112 past the threshold load (i.e., load at point 118) to the base load or dispatch load at point 106.

In another embodiment, the controller 12 may execute instructions enabling the CCPP 10 to follow load path 114. The load path 114 starts at point 93. As explained above, at point 93, the gas turbine system 14 is operating and producing exhaust gas at a starting temperature and driving the load 42 at a minimum load. At point 93, the controller 12 executes instructions that change the operating conditions of the gas turbine system 14, enabling the gas turbine system 14 to follow load path 114. Specifically, the controller 12 executes instructions that increase the load by increasing fuel consumption while maintaining the airflow control module 20 at a minimum airflow condition. The increase in fuel increases the temperature and pressure of the exhaust gases flowing through the turbine 26, which increases the mechanical energy available for power production by load 42. The controller 12 continues increasing fuel consumption with minimal airflow through the airflow control module 20 until the temperature of the exhaust gases substantially reaches the target temperature at point 102 (e.g., within 0-200, 0-150, 0-100, 0-50 degrees of the target temperature). In other words, the controller 12 increases the gas turbine system 14 exhaust gas temperature and load along path 114 from point 93 to point 102. The controller 12 then executes instructions increasing airflow with the airflow control module 20 and increasing fuel consumption in order to increase the load (i.e., increase the load along path 114 from the load at point 102 to the load at point 116), instead of continuing to increase the temperature (i.e., follow load path 98). As explained above, the threshold load may be an HRSG limitation, a minimum emissions compliance load constraint, balance of plant system limitations, etc. As the gas turbine system 14 increases the load from point 102 to substantially the threshold load at point 116 (e.g., within 1, 2, 3, 4, 5, 6, 7, 8, 9, 10 percent of the load at point 116), exhaust gas mass flow rate increases. Accordingly, more exhaust gas is available at the target temperature (i.e., thermal energy), thus enabling the HRSG 18 to produce more steam for the steam turbine system 16. More specifically, the increase in thermal energy enables the HRSG 18 to produce more steam in less time, enabling the CCPP 10 to start faster. The controller 12 substantially maintains the gas turbine system 14 at point 116 while the HRSG produces a suitable amount of steam at the target temperature (e.g., maintain the load and temperature within a respective 1, 2, 3, 4, 5, 6, 7, 8, 9, 10 percent and degrees 0-200, 0-150, 0-100, 0-50 of the load and temperature at point 116). As explained above, the target temperature is the point where the temperature of the exhaust gas equals or is within a temperature range of the metal temperature in the steam turbine system 14. Once the HRSG 18 produces a suitable amount of steam substantially at the target temperature (e.g., within 0-200, 0-150, 0-100, 0-50 degrees of the target temperature), the controller 12 executes instructions that open valve 47, admitting steam into the steam turbine 48. After admitting steam into the steam turbine system 16, the controller 12 executes instructions to increase fuel consumption, which enable the gas turbine system 14 to increase the exhaust gas temperature from point 116 to 118 while substantially holding the load constant at the threshold load (e.g., within 1, 2, 3, 4, 5, 6, 7, 8, 9, 10 percent of the load at point 116). At point 118, the gas turbine system 14 is operating within the minimum emissions compliance load (i.e., the gas turbine system 14 is within emissions requirements). After reaching point 118, the controller 12 executes instructions to increase fuel consumption and to increase airflow with the airflow control module 20, thus increasing the load along path 114 past the threshold load (i.e., load at point 118) to the base load or dispatch load at point 106 (e.g., 20-100, 30-90, 40-80, 50-70 percent of max load).

In still other embodiments, the controller 12 may execute instructions enabling the gas turbine system 14 to partially follow load paths 112 or 114, as described above. However, the controller 12 may execute instructions to increase the load past the load at 116, while substantially maintaining the target temperature (e.g., temperature within 0-200, 0-150, 0-100, 0-50 degrees of the temperature at point 116). More specifically, the controller 12 may execute instructions to increase the load from the load at point 116 to substantially the load at point 120 (i.e., the point where the target temperature intersects the maximum airflow condition or load path 100). As the controller 12 increases the load from point 116 to point 120, the mass flow rate of exhausts gases from the gas turbine system 14 increases, and thus the thermal energy available for steam production in the HRSG 18 (i.e., reducing the start time for the steam turbine system 16). At point 120, the controller 12 executes instructions opening the valve 47 admitting steam into the steam turbine 48. After admitting steam, the controller 12 increases fuel consumption, thus increasing the load to the base load/dispatch power load at point 106 (i.e., follow the remainder of load path 100 from point 120 to point 106).

Figure 3:
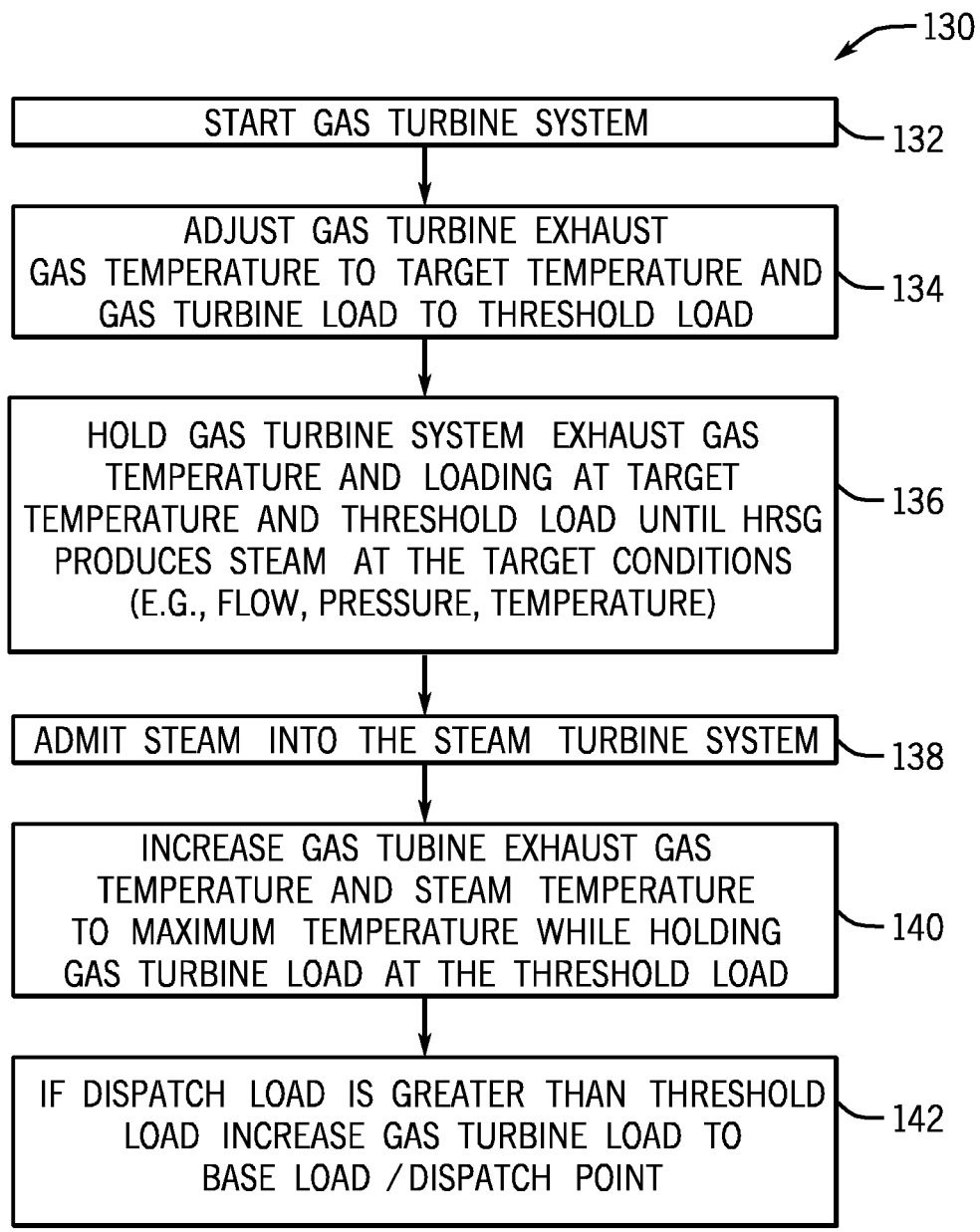
FIG. 3 is a flow chart of an embodiment of a method for loading a gas turbine system in a combined cycle power plant.

FIG. 3 is a flowchart of a method 130 for loading a gas turbine system in a combined cycle power plant. As discussed above, with respect to load path 112, the method 130 begins when the controller executes instructions to start the gas turbine system (block 132). When the gas turbine system starts, but before it begins driving a load, (e.g., electrical generator) it produces exhaust gas at a starting temperature (e.g., point 96). The controller then executes instructions to adjust the gas turbine exhaust gas temperature to substantially a target temperature and to increase the gas turbine load to substantially a threshold load, along load path 112 to point 116 (block 134). For example, the controller 12 may increase the load to a MECL, a limitation associated with the HRSG, or a balance of plant system limitation. The controller holds the gas turbine system exhaust gas temperature and load at substantially the target temperature and threshold load (e.g., point 116) until the HRSG produces enough steam at the target conditions (e.g., flow rate, pressure, temperature) (block 136). Once the HRSG produces a sufficient amount of steam at substantially the target temperature, (e.g., point 116) the controller executes instructions to admit steam into the steam turbine system (block 138). The controller then executes instructions to increase the exhaust gas temperature while holding the gas turbine system at substantially the threshold load (e.g., increase the exhaust gas temperature at point 116 to point 118) (block 140). As the gas turbine exhaust gas increases to the maximum temperature (e.g., at point 118), the exhaust gas increases the steam temperature produced in the HRSG to the maximum temperature. In the final step of method 130, the controller executes instructions to increase the gas turbine load to a base load/dispatch point if the dispatch load is greater than the threshold load (e.g., increase the load from the load at point 118 to the load at point 106) (block 142).

Figure 4:
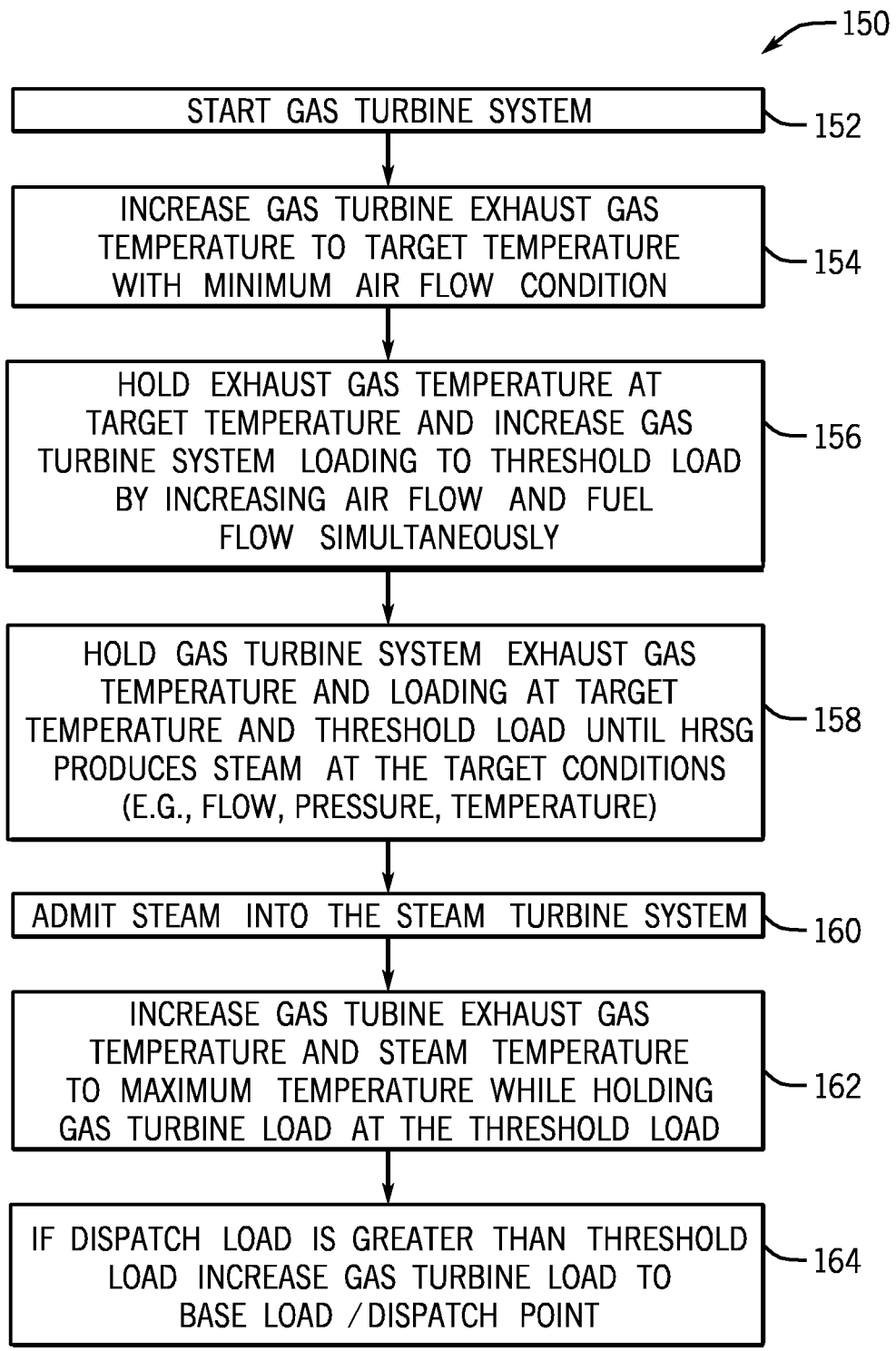
FIG. 4 is a flow chart of an embodiment of a method for loading a gas turbine system in a combined cycle power plant.

FIG. 4 is a flowchart of a method for loading a gas turbine system in a combined cycle power plant. As discussed above, with respect to load path 114, the method 150 begins when the controller executes instructions to start the gas turbine system (block 152). When the gas turbine system starts, but before it begins driving a load, (e.g., electrical generator) it produces exhaust gas at a starting temperature (e.g., temperature at point 93). The controller then executes instructions to increase the gas turbine exhaust gas temperature to substantially a target temperature at a minimal airflow condition (e.g., with an IGV) (e.g., the temperature at point 93 to the temperature at point 102) (block 154). The controller then executes instruction to hold the gas turbine exhaust gas temperature substantially at the target temperature (e.g., temperature at point 102) while increasing the gas turbine system load to substantially a threshold load by increasing airflow and fuel flow simultaneously (e.g., increase load from load at point 102 to the load at point 116) (block 156). The controller then holds the gas turbine system exhaust gas temperature and load substantially at the target temperature and threshold load (e.g., temperature and load at point 116) until the HRSG produces enough steams at the target conditions (e.g., flow rate, pressure, temperature) (block 158). Once the HRSG produces a sufficient amount of steam at substantially the target temperature (e.g., point 116), then the controller executes instructions to admit steam into the steam turbine system (block 160). The controller then executes instructions to increase the exhaust gas temperature, while simultaneously holding the gas turbine system at substantially the threshold load (e.g., increase temperature from temperature at point 116 to the temperature at point 118) (block 162). As the gas turbine exhaust gas temperature increases to the maximum temperature, (e.g., point 118) the steam produced in the HRSG reaches the maximum temperature. In the final step of method 150, the controller executes instructions to increase the gas turbine load to a base load or dispatch power load if the dispatch power load is greater than the threshold load (e.g., increase the load from the load at point 118 to the load at point 106) (block 164).

Technical effects of the invention include the ability start a combined cycle power plant in less time, and within operational constraints (e.g., HRSG constraints, MECL limits, balance of plant system limitations, etc.). Specifically, the disclosed embodiments illustrate a controller capable of loading a gas turbine engine system in a combined cycle power plant using different load paths, thereby enabling the gas turbine system and a steam turbine system to reach a base load or dispatch power load in less time. Moreover, the controller enables the combined cycle power plant to flexibly operate within operational limitations, such as emissions standards, HRSG constraints, balance of plant system limitations, etc.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
 a combined cycle system, comprising:
  a gas turbine system configured to transition between a first load state and a second load state, wherein the gas turbine system comprises an airflow control module configured to adjust an airflow through the gas turbine system between a minimum airflow condition and a maximum airflow condition, wherein the airflow control module comprises an inlet restriction, an inlet guide vane, or a combination thereof;
  a heat recovery steam generator (HRSG) in fluid communication with the gas turbine system, wherein the HRSG is configured to generate a steam using heat from an exhaust gas from the gas turbine system;
  a stream turbine system in fluid communication with the gas turbine system and the heat recovery steam generator, wherein the steam turbine system is driven by the steam to drive a load; and
  a controller configured to control the airflow control module and the gas turbine system to operate with a load path between a first load path corresponding to the minimum airflow condition and a second load path corresponding to the maximum airflow condition, wherein the load path comprises one or more operational constraints related to components of the gas turbine system, and wherein the controller is configured to control the gas turbine system to transition between the first load state and the second load state using the load path between the first and second load paths.

2. The system of claim 1 wherein the controller is configured to operate the gas turbine system along the load path to increase a temperature of the exhaust gas from a starting temperature to a target temperature, wherein the target temperature is less than a maximum temperature of the exhaust gas for the gas turbine system.

3. The system of claim 2, wherein the target temperature is based on one or more temperature thresholds of the steam turbine system.

4. The system of claim 2, wherein the target temperature is based on one or more temperature differentials between a steam temperature of the steam and a metal temperature of one or more components of the steam turbine system.

5. The system of claim 2, wherein the controller is configured to increase the load of the gas turbine system along the load path from the first load state to a threshold load, wherein the first load state is a minimum load, and wherein the threshold load is greater than the first load state and less than the second load state, and wherein the second load state is a maximum load or a dispatch power load.

6. The system of claim 5, wherein the controller is configured to simultaneously increase the temperature to the target temperature and the load of the gas turbine system to the threshold load, or sequentially increase the temperature to the target temperature and the load of the gas turbine system to the threshold load.

7. The system of claim 6, wherein the controller is configured to increase the temperature from the target temperature to a higher temperature while substantially maintaining the load of the gas turbine system at the threshold load.

8. The system of claim 6, wherein the threshold load maintains a minimum emissions compliance load, an HRSG limitation, or a balance of plant system limitation.

9. The system of claim 5, wherein the controller is configured to increase the airflow through the airflow control module to increase the load of the gas turbine system to the threshold load.

10. The system of claim 1, wherein the one or more operational constraints related to components comprise a minimum emission compliance load constraint, a heat recovery steam generator constraint, a balance of plant constraint, or a combination thereof.

11. A non-transitory machine readable medium, comprising:
instructions for controlling a gas turbine system to transition from a first load state to a second load state along a load path between a first load path corresponding to a minimum airflow condition and a second load path corresponding to a maximum airflow condition, wherein the load path comprises one or more operational constraints related to components of the gas turbine system, and wherein the instructions for controlling the gas turbine system comprise instructions for controlling an airflow control module to adjust an airflow through the gas turbine system between the minimum airflow condition and the maximum airflow condition, wherein the airflow control module comprises an inlet restriction, an inlet guide vane, or a combination thereof.

12. The medium of claim 11, wherein the instructions for controlling comprise:
instructions for increasing a temperature of an exhaust gas of the gas turbine system to a target temperature less than a maximum temperature for the gas turbine system;
instructions for increasing a load of the gas turbine system to a threshold load, wherein the threshold load is greater than the first load state and less than the second load state of the gas turbine system, wherein the first load state is a minimum load, and wherein the second load state is a maximum load or a dispatch power load; and
instructions for substantially maintaining the temperature of the exhaust gas at the target temperature while substantially maintaining the load of the gas turbine system at the threshold load.

13. The medium of claim 12, wherein the instructions for controlling comprise:
instructions for increasing the temperature of the exhaust gas from the target temperature to a higher temperature while substantially maintaining the load of the gas turbine system at the threshold load; and
instructions for increasing the load of the gas turbine system from the threshold load to the second load state after increasing the temperature from the target temperature to the higher temperature.

14. The medium of claim 13, wherein the instructions for controlling comprise:
instructions for controlling generation of a steam via a heat recovery steam generator (HRSG) using the exhaust gas from the gas turbine system;
instructions for controlling a steam temperature of the steam while controlling the gas turbine system along the load path; and
instructions for increasing the steam temperature of the steam while increasing the temperature of the exhaust gas in a controlled manner at least partially based on one or more temperature thresholds of a steam turbine system receiving the steam, or one or more temperature differentials between the steam temperature of the steam and a metal temperature of one or more components of the steam turbine system, or a combination thereof.

15. The medium of claim 11, wherein the one or more operational constraints related to components comprise a minimum emission compliance load constraint, a heat recovery steam generator constraint, a balance of plant constraint, or a combination thereof.

16. A method, comprising:
controlling a gas turbine system via a controller to transition from a first load state to a second load state along a load path between a first load path corresponding to a minimum airflow condition and a second load path corresponding to a maximum airflow condition, wherein the load path comprises one or more operational constraints related to components of the gas turbine system, and wherein controlling the gas turbine system comprises controlling an airflow control module to adjust an airflow through the gas turbine system between the minimum airflow condition and the maximum airflow condition, wherein the airflow control module comprises an inlet restriction, an inlet guide vane, or a combination thereof.

17. The method of claim 16, wherein controlling comprises:
increasing a temperature of an exhaust gas of the gas turbine system to a target temperature less than a maximum temperature for the gas turbine system;
increasing a load of the gas turbine system to a threshold load, wherein the threshold load is greater than the first load state and less than the second load state of the gas turbine system, and wherein the first load state is a minimum load and the second load state is a maximum load or a dispatch power load; and
substantially maintaining the temperature of the exhaust gas at the target temperature while substantially maintaining the load at the threshold load.

18. The method of claim 17, wherein controlling comprises increasing the temperature of the exhaust gas from the target temperature to a higher temperature while substantially maintaining the load at the threshold load.

19. The method of claim 18, wherein controlling comprises:
controlling generation of a steam via a heat recovery steam generator (HRSG) using the exhaust gas from the gas turbine system;
controlling a steam temperature of the steam while controlling the gas turbine system along the load path; and
increasing the steam temperature of the steam while increasing the temperature of the exhaust gas in a controlled manner at least partially based on one or more temperature thresholds of a steam turbine system receiving the steam, or one or more temperature differentials between the steam temperature of the steam and a metal temperature of one or more components of the steam turbine system, or a combination thereof.

20. The method of claim 18, comprising increasing the load of the gas turbine system from the threshold load to the second load state after increasing the temperature from the target temperature to the higher temperature.

21. The method of claim 16, wherein the one or more operational constraints related to components comprise a minimum emission compliance load constraint, a heat recovery steam generator constraint, a balance of plant constraint, or a combination thereof.

\* \* \* \* \*